(12) United States Patent
Mitchell et al.

(10) Patent No.: US 9,698,431 B2
(45) Date of Patent: *Jul. 4, 2017

(54) DIFFUSION MEDIA AND METHOD OF PREPARATION

(75) Inventors: James Mitchell, Bloomfield, NY (US); Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 859 days.

This patent is subject to a terminal disclaimer.

(21) Appl. No.: 13/483,717

(22) Filed: May 30, 2012

(65) Prior Publication Data

US 2013/0320583 A1 Dec. 5, 2013

(51) Int. Cl.
- *B29C 67/00* (2017.01)
- *B82Y 99/00* (2011.01)
- *H01M 8/0243* (2016.01)
- *H01M 8/0239* (2016.01)

(52) U.S. Cl.
CPC ....... *H01M 8/0243* (2013.01); *H01M 8/0239* (2013.01); *Y02E 60/50* (2013.01)

(58) Field of Classification Search
CPC ....... Y02E 60/50; H01M 8/02; H01M 8/0239; H01M 8/0243
USPC ......... 264/104, 105, 172.11, 172.16, 172.17, 264/172.18
See application file for complete search history.

(56) References Cited

U.S. PATENT DOCUMENTS

| 5,164,132 A | 11/1992 | Robeson et al. |
| 5,654,114 A | 8/1997 | Kubota et al. |
| 6,090,472 A | 7/2000 | Wang et al. |
| 2001/0041283 A1* | 11/2001 | Hitomi ............................ 429/42 |
| 2006/0257717 A1 | 11/2006 | Huang |
| 2011/0143262 A1* | 6/2011 | Fultz ................... H01M 4/8807 429/513 |
| 2012/0102725 A1* | 5/2012 | Fuller et al. ................. 29/623.1 |
| 2013/0327494 A1* | 12/2013 | Mitchell et al. .............. 164/520 |
| 2013/0330655 A1* | 12/2013 | Mitchell et al. .............. 429/514 |
| 2014/0045093 A1* | 2/2014 | Mitchell et al. .............. 429/482 |

(Continued)

FOREIGN PATENT DOCUMENTS

| CN | 1862856 A | 11/2006 |
| WO | 97/00981 | 1/1997 |

OTHER PUBLICATIONS

Non-final Office Action mailed Jun. 3, 2014 in U.S. Appl. No. 12/913,955, filed Oct. 28, 2010, 12 pgs.

(Continued)

*Primary Examiner* — Robert J Grun
(74) *Attorney, Agent, or Firm* — Brooks Kushman P.C.

(57) ABSTRACT

Resinous fibers of nanometer to micrometer width dimensions are drawn from a multi-component system by a melt extrusion process. The process includes a step of combining a fiber resin with a water-soluble carrier resin to form a resinous mixture. The resinous mixture is extruded to form an extruded resinous mixture, the extruded resinous mixture having strands of the fiber resin with the carrier resin. The extruded resinous mixture is then contacted with water to separate the strands of the fiber resin from the carrier resin. An electrically conductive fibrous sheet is then formed from the strands of fiber resin. The fibrous sheets are useful as diffusion layers in fuel cells.

19 Claims, 3 Drawing Sheets

(56) References Cited

U.S. PATENT DOCUMENTS

2014/0113214 A1* 4/2014 Mitchell et al. ............. 429/487

OTHER PUBLICATIONS

Final Office Action mailed Sep. 11, 2014 for U.S. Appl. No. 12/913,955, filed Oct. 28, 2010, 12 pgs.
Non-final Office Action mailed Dec. 31, 2014 for U.S. Appl. No. 12/913,955, filed Oct. 28, 2010, 12 pgs.

* cited by examiner

DIFFUSION MEDIA AND METHOD OF PREPARATION

FIELD OF THE INVENTION

The present invention relates to porous pads that are useful in fuel cell applications.

BACKGROUND OF THE INVENTION

High quality porous pads are used for filtration and in a number of electronic devices such as batteries and fuel cells. In such devices, the porous pads advantageously allow gases or components dissolved in liquids to pass through. Porous pads are made of micro-fibers, nanofibers, and micro-porous films. Fibers of these dimensions are prepared by electrospinning in the case of solvent soluble polymers. However, polyolefins are difficult to form solutions without maintaining high temperatures in high-boiling solvents. Porous polyolefins are made by biaxial tension on films or sheets of these plastic polymers. Alternatively, pore formers are added to the polyolefin sheets during the fabrication process which are then extracted by solvents or removed with heat. Electrospinning can be used in the case of solvent soluble olefins which can be processed in solutions.

In proton exchange membrane ("PEM") type fuel cells, hydrogen is supplied to the anode as fuel, and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Typically, the ion conductive polymer membrane includes a perfluorosulfonic acid ("PFSA") ionomer.

Each catalyst layer has finely divided catalyst particles (for example, platinum particles), supported on carbon particles, to promote oxidation of hydrogen at the anode, and reduction of oxygen at the cathode. Protons flow from the anode through the ion conductive polymer membrane to the cathode where they combine with oxygen to form water which is discharged from the cell.

The MEA is sandwiched between a pair of porous gas diffusion layers ("GDL"), which in turn are sandwiched between a pair of electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cells in stacks in order to provide high levels of electrical power.

In many fuel cell applications, electrode layers are formed from ink compositions that include a precious metal and a perfluorosulfonic acid polymer ("PFSA"). For example, PFSA is typically added to the Pt/C catalyst ink in electrode layer fabrication of proton exchange membrane fuel cells to provide proton conduction, to the dispersed Pt-carbon catalyst nanoparticles, as well as binding of the porous carbon network. Traditional fuel cell catalysts combine carbon black with platinum deposits on the surface of the carbon, along with ionomers. The carbon black provides (in part) a high surface area conductive substrate. The platinum deposits provide a catalytic behavior, and the ionomers provide a proton conductive component. The electrode is formed from an ink that contains the carbon black catalyst and the ionomer, which combine on drying to form an electrode layer.

Gas diffusion layers have a multifunctional role in fuel cell technology. For example, gas diffusion layers act as diffusers for reactant gases traveling to the anode and the cathode layers while transporting product water to the flow field. Gas diffusion layers also conduct electrons and transfer heat generated at the membrane electrode assembly to the coolant, and act as a buffer layer between the soft membrane electrode assembly and the stiff bipolar plates. Although the present technologies for making gas diffusion layers for fuel cell applications work reasonably well, improvement in properties and cost are still desirable.

Accordingly, the present invention provides improved methods of making porous pads that are useful in fuel cell applications.

SUMMARY OF THE INVENTION

The present invention solves one or more problems of the prior art by providing in at least one embodiment a method of forming an electrically conductive fibrous sheet that is useful in fuel cell applications. The method of this embodiment includes a step of combining a fiber-forming resin with a water-soluble carrier resin to form a resinous mixture. The resinous mixture is extruded to form an extruded resinous mixture. Characteristically, the extruded resinous mixture has strands of the fiber-forming resin within a larger strand of the carrier resin. The extruded resinous mixture is then contacted with water to separate the strands of the fiber-forming resin from the carrier resin. An electrically conductive fibrous sheet is then formed from the strands of fiber-forming resin. Finally, the electrically conductive fibrous sheet is integrated and interposed between an anode and a cathode. The method is advantageously used to make miniscule fibers of polyolefins useful as porous supports and is amenable to the continuous, large scale, and inexpensive processing of low cost polymers and polymer fibers. The method lends itself to creating materials with customized thermal, dimensional, and chemical properties. It is readily scalable, reproducible and lends itself to continuous processing techniques with inexpensive, environmentally friendly components and manufacturing.

In another embodiment, a method of making a device with an electrically conductive fibrous sheet is provided. The method comprises combining a thermoplastic resin with a water-soluble polyamide resin to form a resinous mixture. The resinous mixture is then extruded to form an extruded resinous mixture, the extruded resinous mixture having strands of the thermoplastic resin within a larger strand of the water-soluble carrier resin. The extruded resinous mixture is contacted with water to separate the strands of the thermoplastic resin from the water-soluble polyamide (e.g., poly[2-ethyl-2-oxazoline]) resin. An electrically conductive fibrous sheet is formed from the strands of the thermoplastic resin. Finally, the electrically conductive fibrous sheet is integrated and interposed between an anode and a cathode. The water soluble resin can be poly(2-ethyl-2-oxazoline) (PEOX), polyethyleneoxide (PEO), and the like.

BRIEF DESCRIPTION OF THE DRAWINGS

Exemplary embodiments of the present invention will become more fully understood from the detailed description and the accompanying drawings, wherein.

DESCRIPTION OF THE INVENTION

Figure 1:
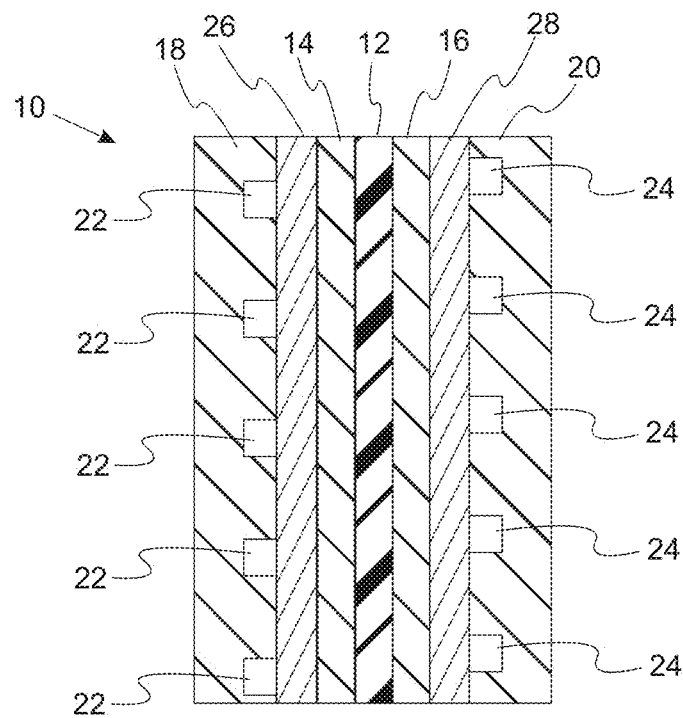
FIG. 1 provides a schematic illustration of a fuel cell incorporating a separator.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

With reference to FIG. 1, a schematic cross section of a fuel cell that incorporates an embodiment of a fibrous sheet is provided. Proton exchange membrane (PEM) fuel cell 10 includes polymeric ion conducting membrane 12 disposed between cathode catalyst layer 14 and anode catalyst layer 16. Fuel cell 10 also includes flow field electrically conductive plates 18, 20, gas channels 22 and 24, and gas diffusion layers 26 and 28. Advantageously, diffusion layers 26 and 28 are made by a variation of the process set forth below. During operation of the fuel cell 10, a fuel such as hydrogen is feed to the flow field plate 20 on the anode side and an oxidant such as oxygen is feed flow field plate 18 on the cathode side. Hydrogen ions are generated by anode catalyst layer 16 migrate through polymeric ion conducting membrane 12 were they react at cathode catalyst layer 14 to form water. This electrochemical process generates an electric current through a load connect to flow field plates 18 and 20.

Figure 2:
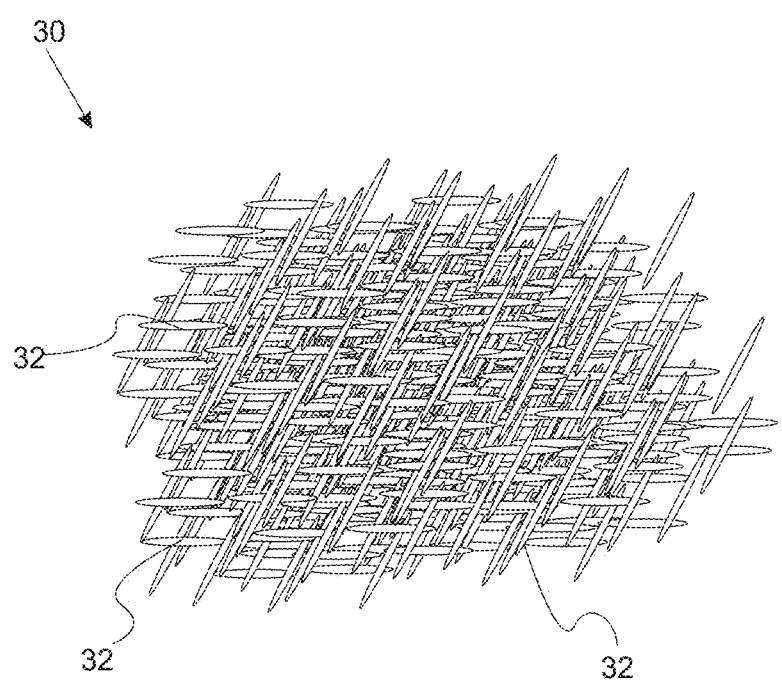
FIG. 2 is an idealized top view of a fibrous plate or pad made by a variation of the method set forth below.

With reference to FIG. 2, an idealized top view of a fibrous sheet made by a variation of the method set forth below is provided. Fibrous sheet 30 is formed from a plurality of resinous fibers 32 aggregated together to form a pad. Typically, resinous fibers 32 have an average width from about 5 nanometers to about 30 microns. In another refinement, resinous fibers 32 have an average width of about 5 nanometers to about 10 microns. In still another refinement, resinous fibers 32 have an average width of from about 10 nanometers to about 5 microns. In still another refinement, resinous fibers 32 have an average width of from about 100 nanometers to about 5 microns. In still another refinement, resinous fibers 32 have an average width of from about 500 nanometers to about 20 microns. Typically, fibrous sheet 30 is electrically conductive.

In a variation of the present embodiment, fibrous sheet 30 has a thickness from about 50 microns to about 2 mm. In a refinement, fibrous sheet 30 has a thickness from about 50 microns to about 1 mm. In another refinement, fibrous sheet 30 has a thickness from about 100 microns to about 500 mm.

In a variation of the present invention, the fibrous sheet includes a wetting agent. Such a wetting agent may be added as a separate component or grafted onto a polymer backbone.

In another variation, fibrous sheet 30 includes voids that result in porosity. In a refinement, the porosity is from about 5 to 95 volume percent. In this context, porosity means the volume percent of the sheet that is empty. In another refinement, the porosity is from about 20 to 80 volume percent. In still another refinement, the porosity is from about 40 to 60 volume percent.

Figure 3:
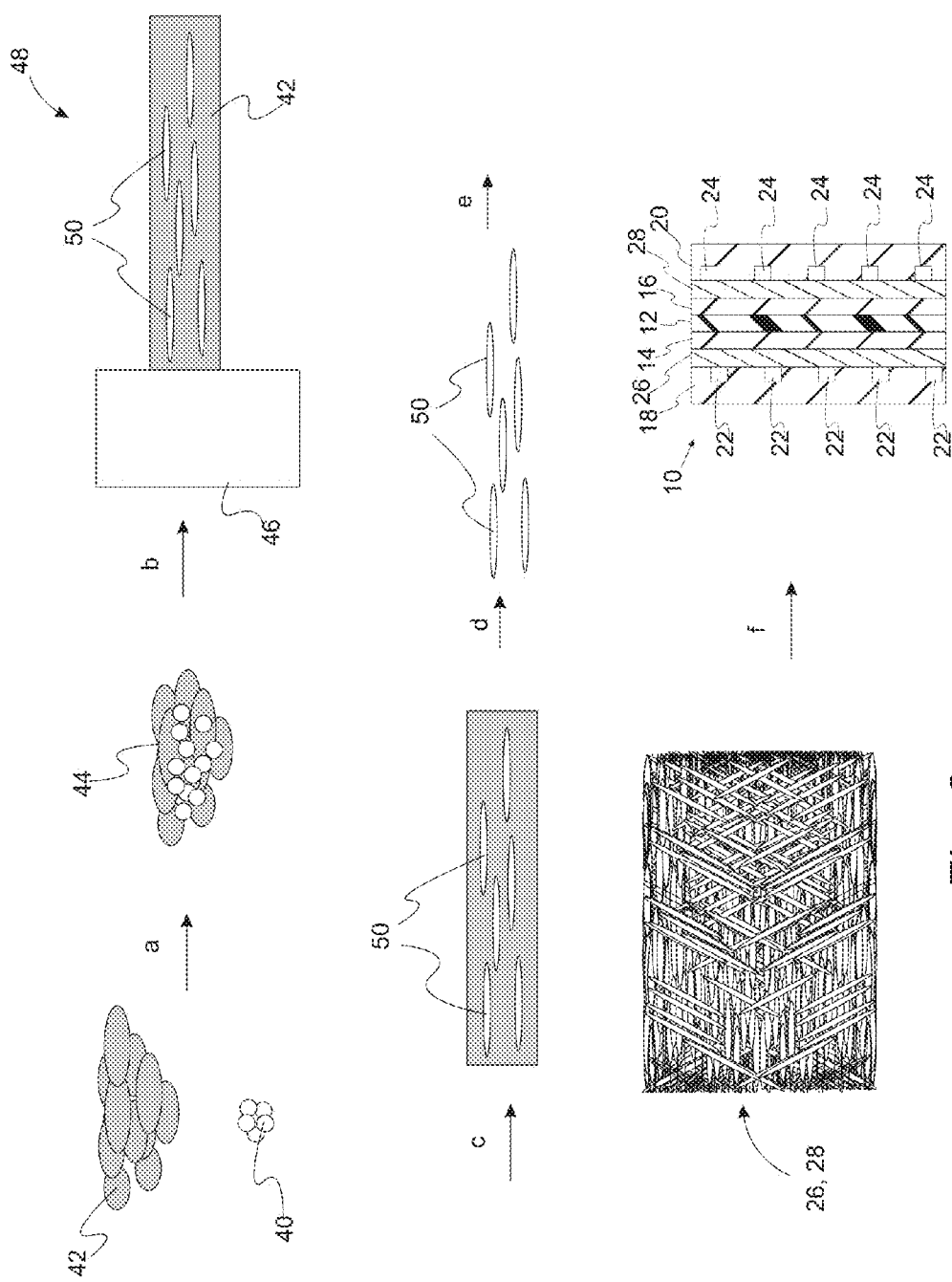
FIG. 3 is a schematic flow chart showing the fabrication of a gas diffusion layer for fuel cell applications.

With reference to FIG. 3, a schematic flow chart showing the fabrication of a separator porous fiber pad is provided. In step a), fiber-forming resin 40 is combined with a water soluble carrier resin 42 to form resinous mixture 44. Fiber-forming resin 40 includes a polymeric resin and a plurality of electrically conductive particles. In a refinement, the weight ratio of fiber-forming resin 40 to water soluble carrier resin 42 is between 1:100 and 10:1. In another refinement, the weight ratio of fiber-forming resin 40 to water soluble carrier resin 42 is between 1:50 and 10:1. In another refinement, the weight ratio of fiber-forming resin 40 to water soluble carrier resin 42 is between 1:10 and 10:1. In still another refinement, the weight ratio of fiber-forming resin 40 to water soluble carrier resin 42 is between 0.2 and 0.8. In still another refinement, fiber-forming resin 40 includes from about 0.5 to about 80 weight percent electrically conductive particles of the total weight of fiber-forming resin 40 (resin plus particles). Examples of suitable electrically conductive particles include, but are not limited to, carbon black, graphite, platinum, gold, palladium, and the like, and combinations thereof. In a refinement, the electrically conductive particles have a spatial dimension (e.g., a diameter) from about 5 nm to about 1 micron. In a refinement, the electrically conductive particles have a spatial dimension (e.g., a diameter) from about 5 nm to about 100 nm. In a refinement, the electrically conductive particles have a spatial dimension (e.g., a diameter) from about 10 nm to about 50 nm.

Fiber resin 40 is the resin that will form resinous fibers 50 while carrier resin 42 is a water-soluble resin. In one refinement, fiber-forming resin 40 is a thermoplastic polymer. Examples of suitable thermoplastic polymers for fiber-forming resin 40 include, but are not limited to, polyolefins, polyesters, and combinations thereof. Other examples include, but are not limited to, polyethylene, polypropylene, polybutene, polybutylene terephthalate, perfluorosulfonic acid polymers, perfluorocyclobutane polymers, polycycloolefins, polyperfluorocyclobutanes, polyamides (not water soluble), polylactides, acrylonitrile butadiene styrene, acrylic, methacrylic, ethylene-vinyl acetate, ethylene vinyl alcohol, fluoropolymers (e.g., PTFE, FEP, etc), polyacrylates, polyacrylonitrile (e.g., PAN), polyaryletherketone, polybutadiene, polybutylene, polybutylene terephthalate, polycaprolactone, polychlorotrifluoroethylene, polyethylene terephthalate, polycyclohexylene dimethylene terephthalate, polycarbonate, polyhydroxyalkanoates, polyketone, polyetherketone, polyetherimide, polyethersulfone, polyethylenechlorinates, polymethylpentene, polyphenylene oxide, polystyrene, polysulfone, polytrimethylene terephthalate, polyurethane, polyvinyl acetate, polyvinyl chloride, polyvinylidene chloride, styrene-acrylonitrile, and combinations thereof. Examples of suitable water-soluble resins include, but are not limited to, water-soluble polyamides (e.g., poly(2-ethyl-2-oxazoline) ("PEOX"). In a refinement, the water-soluble polyamide resin comprises a component selected from the group consisting of polyethylene oxide, poly(N-vinylpyrolidone), poly(2-R-2-oxazoline) where R=H, methyl, ethyl, propyl, butyl, or phenyl, etc.), and mixtures and co-polymers thereof. In a refinement, the PEOX has a weight average molecular weight from about 50,000 to 500,000.

In step b), the materials are co-extruded at an elevated temperature using extruder 46, with resin fibers 50 forming in the carrier resin 52. In step c), the extruded strand is optionally separated from extruder 46. In step d), resin fibers 50 are freed from the strand by contacting (e.g., washing) in water. In step e), resin fibers 50 are formed into gas diffusion layers 26 and/or 28. Gas diffusion layers 26 and 28 may be formed by pressing and heating of fibers 50. In another refinement, fibers 50 are bonded to paper or a mat. Typically, gas diffusion layers 26 and 28 are pad shaped having a thickness from about 10 microns to 5 mm. Finally, gas diffusion layers 26 and 28 are placed between a flow field plate and an anode layer or cathode layer in step f) to form a fuel cell with the gas diffusion layer contained therein. For optimal performance, gas diffusion layers are conductive such that electrons can pass from catalyst layer 14 (the anode) through the gas diffusion layer 26 to the flow field plate 18 through a circuit (with load such as a motor) to the flow field plate 20 to the gas diffusion layer 28, to the cathode catalyst layer 16. In the case of polyacrylonitrile, a conductive fibrous pad can be made by pryrolysis and carbonization or graphitization of the porous mats at temperatures in excess of 300° C. Conductivity can also be imparted to the fibers by introducing carbon black or graphite to the water-insoluble resin (by extrusion) at more than 7.5 weight % loadings before extrusion with the water-soluble polymer (such as poly(2-ethyl-2-oxazoline)). In another variation, the fibrous pad is rendered electrically conductive by coating resin fibers 50 with a metal layer. In a refinement, the metal layer comprises a component selected from the group consisting of chrome, nickel, stainless steel, gold, palladium, platinum, and combinations thereof. Suitable film coating processes for forming the catalyst-containing layer include, but are not limited to, physical vapor deposition (PVD), plasma enhanced chemical vapor deposition (PECVD), magnetron sputtering, electron beam deposition, ion beam enhanced deposition, ion assisted deposition, chemical vapor deposition, electroplating, and the like.

In a refinement of the present invention for the variations and embodiments set forth above, the fibers have an average cross sectional width (i.e., diameter when the fibers have a circular cross section) from about 10 nanometers to about 30 microns. In another refinement, the fibers have an average width from about 5 nanometers to about 10 microns. In still another refinement, the fibers have an average width from about 10 nanometers to about 5 microns. In still another refinement, the fibers have an average width of from about 100 nanometers to about 5 microns. The length of the fibers typically exceeds the width. In a further refinement, the fibers produced by the process of the present embodiment have an average length from about 1 mm to about 20 mm or more. The fibers produced herein have a fiber diameter range between the two size ranges, usually less than those common to cellulose papers and other natural fiber membranes. Electro-spun fibers and expanded Teflon membranes (EPTFE) have fibers commonly in the low to mid 100's of nanometer range. Paper fibers, extruded strands and drawn fibers and threads are commonly in the 100's to thousands of microns in diameter.

The following examples illustrate the various embodiments of the present invention. Those skilled in the art will recognize many variations that are within the spirit of the present invention and scope of the claims.

Example 1

High Surface Area Graphitized Carbon (Cabot EG 15) is added to polyethylene (PE) powder (7,700 Mn (number average molecular weight), 35,000 Mw (weight average molecular weight), Aldrich catalog number 47799-1KG) in the hopper of a laboratory mixing extruder (Dynisco, LME) operated at 140° C. header and rotor set temperatures with the drive motor operated at 50% of capacity. The resulting extruded strand is reduced to granular form in a Waring blender, and then combined with poly(2-ethyl-2-oxazoline) (PEOX) (50,000 Mw, Aldrich 372846-500G) in the blender in a ratio of 10 to 1 PEOX to carbon-PE blend.

The resulting three component blend is again extruded at the previous conditions, resulting in a combined strand of PEOX and carbon loaded PE. The extruded strand contains carbon loaded PE fibers, which are released upon washing in 250 ml of water in the Waring blender. The fibers released from the water soluble PEOX are dried by washing in isopropyl alcohol, and tested for electrical resistance.

Example 2

Polyethylene powder (7,700 Mn, 35,000 Mw, Aldrich catalog number 47799-1KG) is combined with poly(2-ethyl- 2-oxazoline) (PEOX) (50,000 Mw, Aldrich 372846-500G) in a Waring blender in a ratio of 10 to 1 PEOX to carbon-PE blend. The resulting component blend is extruded resulting in a combined strand of PEOX and PE. The extruded strand contains PE fibers which are released upon washing in 250 ml of water in the Waring blender. The fibers released from the water soluble PEOX are dried into a mat and washed in isopropyl alcohol. The mat is then coated with gold palladium under vacuum in a Denton coating system. Coating times of 20 seconds up to 1 hour are used to create various levels of conductive fibers.

Example 3

Polyethylene powder (7,700 Mn, 35,000 Mw, Aldrich catalog number 47799-1KG) is combined with poly(2-ethyl-2-oxazoline) (PEOX) (50,000 Mw, Aldrich 372846-500G) in a Waring blender in a ratio of 10 to 1 PEOX to carbon-PE blend. The resulting component blend is extruded resulting in a combined strand of PEOX and PE. The extruded strand contains PE fibers which are released upon washing in 250 ml of water in the Waring blender. The fibers released from the water soluble PEOX are dried into a mat and washed in isopropyl alcohol. These fibers are then prepared for electrolytic plating using a nickel strike, followed by electroplating of chrome.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making a device with a fibrous sheet, the method comprising:
    combining a fiber-forming resin with a carrier resin to form a resinous mixture, the carrier resin being water soluble;
    extruding the resinous mixture to form an extruded resinous mixture, the extruded resinous mixture having strands of the fiber-forming resin within the carrier resin;
    contacting the extruded resinous mixture with water to separate the strands of the fiber-forming resin from the carrier resin; and
    forming an electrically conductive fibrous sheet from the strands of the fiber-forming resin, wherein the electrically conductive fibrous sheet is formed by coating the strands of fiber-forming resin with a metal layer; and
    interposing the fibrous sheet between an anode and a cathode.

2. The method of claim 1 wherein the fiber-forming resin includes a plurality of electrically conductive particles.

3. The method of claim 2 wherein the electrically conductive particles are selected from the group consisting of carbon particles, graphite particles, metal particles, and combinations thereof.

4. The method of claim 1 wherein the metal layer includes a component selected from the group consisting of chrome, nickel, stainless steel, gold, palladium, platinum, and combinations thereof.

5. The method of claim 1 further comprising placing the fibrous sheet between a catalyst layer and a flow field plate wherein the fibrous sheet is a gas diffusion layer.

6. The method of claim 1 wherein the fiber-forming resin is a thermoplastic polymer.

7. The method of claim 1 wherein the fiber-forming resin comprises a component selected from the group consisting of polyolefins, polyesters, and combinations thereof.

8. The method of claim 1 wherein the fiber-forming resin comprises a component selected from the group consisting of an extrudable thermoplastic polymer such as polyethylene, polypropylene, polybutene, polybutylene terephthalate, perfluorosulfonic acid polymers, perfluorocyclobutane polymers, acrylonitrile butadiene styrene, acrylic, ethylene-vinyl acetate, ethylene vinyl alcohol, fluoropolymers, polyacrylates, polyacrylonitrile, polyaryletherketone, polybutadiene, polybutylene, polycaprolactone, polychlorotrifluoroethylene, polyethylene terephthalate, polycyclohexylene dimethylene terephthalate, polycarbonate, polyhydroxyalkanoates, polyketone, polyetherketone, polyetherimide, polyethersulfone, polyethylenechlorinates, polymethylpentene, polyphenylene oxide, polystyrene, polysulfone, polytrimethylene terephthalate, polyurethane, polyvinyl acetate, polyvinyl chloride, polyvinylidene chloride, styrene-acrylonitrile, and combinations thereof.

9. The method of claim 1 wherein the carrier resin is a water-soluble polyamide.

10. The method of claim 1 wherein the carrier resin comprises poly(2-ethyl-2-oxazoline).

11. The method of claim 1 wherein the weight ratio of fiber-forming resin to carrier resin is from about 1:100 to about 10:1.

12. The method of claim 1 wherein the strands of the fiber-forming resin have an average width from about 5 nanometers to about 10 microns.

13. A method of making a device with a fibrous sheet, the method comprising:
    combining a thermoplastic resin with a water-soluble polyamide resin to form a resinous mixture, the weight ratio of thermoplastic resin to water-soluble polyamide resin being from about 1:100 to about 10:1;
    extruding the resinous mixture to form an extruded resinous mixture, the extruded resinous mixture having strands of the thermoplastic resin with the water-soluble polyamide resin;
    contacting the extruded resinous mixture with water to separate the strands of the thermoplastic resin from the water-soluble polyamide resin; and
    forming an electrically conductive fibrous sheet from the strands of the thermoplastic resin, wherein the electrically conductive fibrous sheet is formed by coating the strands of the thermoplastic resin with a metal layer; and
    interposing the fibrous sheet between an anode and a cathode.

14. The method of claim 13 wherein the thermoplastic resin includes a plurality of electrically conductive particles.

15. The method of claim 14 wherein the electrically conductive particles are selected from the group consisting of carbon particles, graphite particles, metal particles, and combinations thereof.

16. The method of claim 13 wherein the metal layer comprises a component selected from the group consisting of chrome, nickel, stainless steel, gold, palladium, platinum, and combinations thereof.

17. The method of claim 13 wherein the water-soluble polyamide resin comprises a component selected from the group consisting of polyethylene oxide, poly(N-vinylpyrolidone), poly(2-R-2-oxazoline) where R=H, methyl, ethyl, propyl, butyl, or phenyl, and mixtures and co-polymers thereof.

18. The method of claim 1 further comprising adding a wetting agent to the fibrous sheet that is grafted onto a polymer backbone.

19. The method of claim 13 further comprising adding a wetting agent to the fibrous sheet that is grafted onto a polymer backbone.

\* \* \* \* \*